(12) United States Patent
Abe et al.

(10) Patent No.: US 9,242,868 B2
(45) Date of Patent: Jan. 26, 2016

(54) PROCESS FOR SEPARATING MONOSILANE FROM CHLOROSILANES-RICH MIXTURE

(75) Inventors: Isao Abe, Kobe (JP); Shinji Tomita, Kako-gun (JP)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 179 days.

(21) Appl. No.: 13/820,386

(22) PCT Filed: Aug. 29, 2011

(86) PCT No.: PCT/EP2011/064797
§ 371 (c)(1),
(2), (4) Date: Mar. 1, 2013

(87) PCT Pub. No.: WO2012/028570
PCT Pub. Date: Mar. 8, 2012

(65) Prior Publication Data
US 2013/0156677 A1 Jun. 20, 2013

(30) Foreign Application Priority Data
Sep. 3, 2010 (EP) .................................... 10305947

(51) Int. Cl.
*C01B 33/04* (2006.01)
*B01D 53/00* (2006.01)
*B01J 31/02* (2006.01)

(52) U.S. Cl.
CPC .............. *C01B 33/046* (2013.01); *C01B 33/043* (2013.01); *B01D 53/002* (2013.01); *B01D 2257/553* (2013.01); *B01J 31/0237* (2013.01); *B01J 31/0239* (2013.01)

(58) Field of Classification Search
CPC ............ B01D 2257/553; B01D 53/002; B01J 31/0237; B01J 31/0239; C01B 33/043; C01B 33/046
See application file for complete search history.

(56) References Cited

U.S. PATENT DOCUMENTS 6,905,576 B1 * 6/2005 Block et al. ..................... 203/29

FOREIGN PATENT DOCUMENTS

| EP | 2 085 358 | | 8/2009 | |
|---|---|---|---|---|
| EP | 2085358 | A1 * | 8/2009 | ............... B01J 31/02 |

(Continued)

OTHER PUBLICATIONS

International Search Report and Written Opinion for PCT/EP2011/064797, Sep. 21, 2011.

*Primary Examiner* — Amber Orlando
*Assistant Examiner* — Cabrena Holecek
(74) *Attorney, Agent, or Firm* — Patricia E. McQueeney

(57) ABSTRACT

A process for separating monosilane from a mixture comprising monosilane and chlorosilanes comprising: a) Introducing mixture to a condenser (3) for separating lower-boiling chlorosilanes—containing monosilane from higher-boiling chlorosilanes enriched condensates; b) Collecting said higher-boiling condensates, in a condensate buffer (19) connected to the aforesaid condenser (3) by a condensate feed pipe (8); c) Sending higher-boiling chlorosilanes enriched condensates from the aforesaid condensate buffer (19) into a subcooler (21) which is installed on a reflux feed line (7) connected to the upper portion of a chlorosilane absorber (20); d) Feeding lower-boiling chlorosilanes—containing monosilane to the aforesaid chlorosilane absorber (20) for separating monosilane; e) Extracting monosilane—rich gas from the upper portion of the aforesaid chlorosilane absorber (20).

8 Claims, 1 Drawing Sheet

(56) References Cited

FOREIGN PATENT DOCUMENTS

| | | | | |
|---|---|---|---|---|
| JP | 60 215513 | 10/1985 | | |
| JP | 60215513 A | * 10/1985 | | C01B 33/04 |
| JP | 61 053108 | 3/1986 | | |
| JP | 61053108 | * 3/1986 | | C01B 33/04 |
| JP | S61 191513 | 8/1986 | | |
| JP | 1 317114 | 12/1989 | | |
| JP | 6 333422 | 12/1994 | | |
| WO | WO 95 26927 | 10/1995 | | |
| WO | WO 2007 039326 | 4/2007 | | |
| WO | WO 2007039326 A1 | * 4/2007 | | B01J 8/02 |

\* cited by examiner

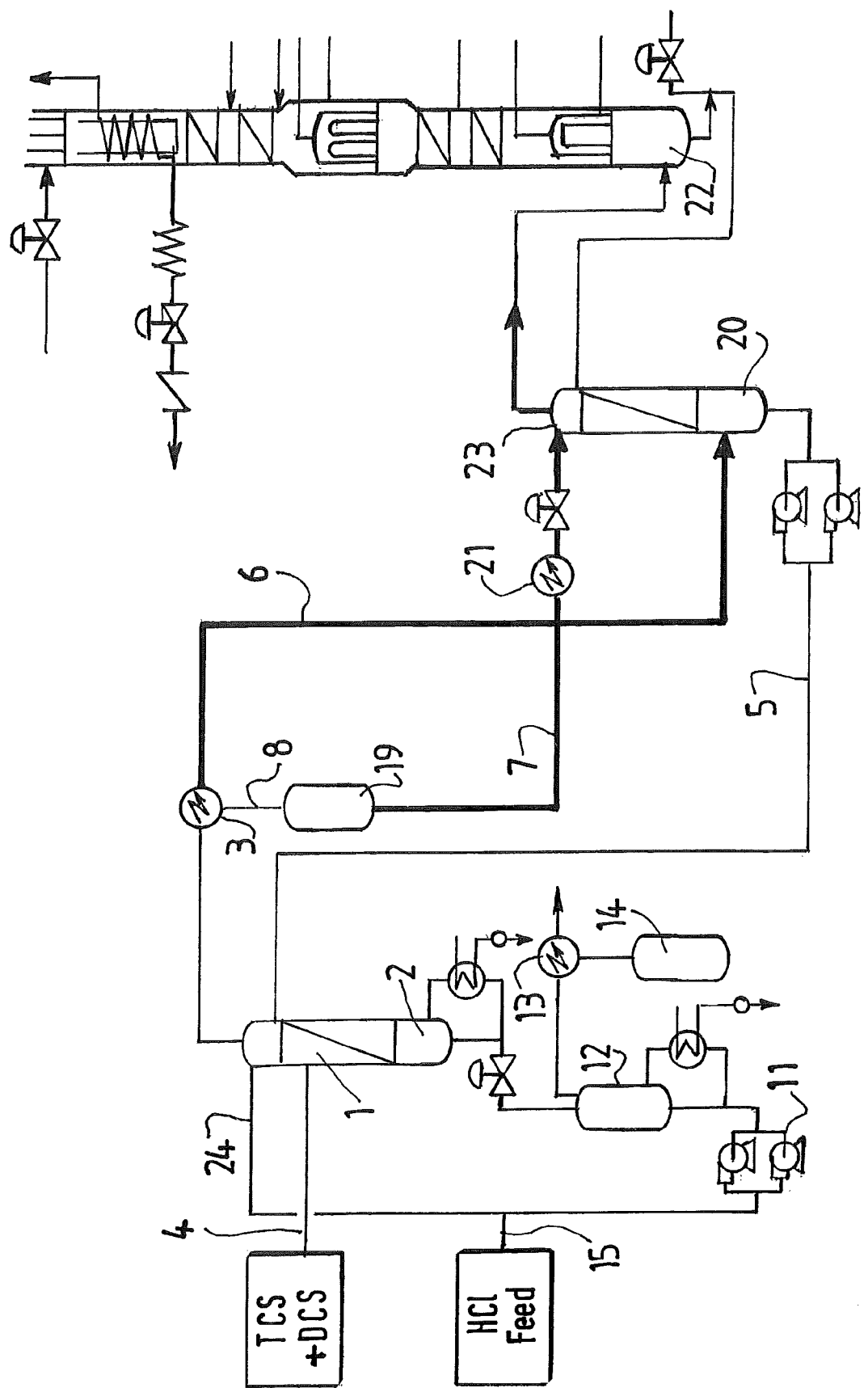

PROCESS FOR SEPARATING MONOSILANE FROM CHLOROSILANES-RICH MIXTURE

CROSS REFERENCE TO RELATED APPLICATIONS

This application is a 371 of International Application PCT/EP2011/064797 filed Aug. 29, 2011, which claims priority to European Application No. 10305947.3 filed Sep. 3, 2010, the entire contents of which are incorporated herein by reference.

BACKGROUND

The present invention relates to a process for separating monosilane from chlorosilanes-rich mixture. In particular, said process is downstream a process for continuously producing monosilane, the demand for which is recently increasing as a raw material for epitaxy of silicon with a high purity and for amorphous silicon for solar cells for example.

A known process for producing monosilane is a process for producing monosilane gas by disproportionating a hydrogenated silicon chloride such as trichlorosilane in the presence of a tertiary amine hydrochloride as a catalyst (JP-B-64-3804 and JP-B-63-33422).

Furthermore, another known process is a process for producing monosilane gas by packing a solid catalyst in a reaction column and disproportionating dichlorosilane therein (JP2,648,615). However, since the conversion reaction to monosilane is an equilibrium reaction, the equilibrated conversion ratio has not necessarily been high heretofore, from 10% to 18%, and a large-size apparatus has been required to achieve a desired production amount.

Another known process is a process for continuously producing monosilane readily and efficiently with a large production amount of monosilane from trichlorosilane and dichlorosilane as raw materials (production amount per hour in use of an apparatus with the same reaction performance). EP 2085358 discloses a process for continuously producing monosilane by means of a monosilane production apparatus comprising a reaction column, a plurality of upper condensers each of which has a reflux feed pipe serially connected to a top portion of the reaction column, a bottom reboiler of the reaction column, and an evaporation tank connected to a bottom portion of the reaction column; the process comprising supplying at least one of trichlorosilane and dichlorosilane to a middle stage of the reaction column, supplying at least one of a tertiary aliphatic hydrocarbon-substituted amine and a tertiary aliphatic hydrocarbon-substituted amine hydrochloride as a catalyst to an upper stage of the reaction column, introducing a resultant mixture containing monosilane, monochlorosilane, dichlorosilane, and trichlorosilane from the top portion of the reaction column to the plurality of upper condensers, separating monosilane from condensates containing monochlorosilane, dichlorosilane, and trichlorosilane at a temperature of from 50° C. to −50° C. in the upper condensers, recycling the condensates after separating monosilane, through the reflux feed pipes to the upper stage of the reaction column, bringing the condensates into contact with the catalyst in the reaction column, withdrawing a bottom recovery liquid containing tetrachlorosilane and the catalyst from the bottom portion of the reaction column, introducing the bottom recovery liquid into the evaporation tank, and recycling the catalyst recovered from the bottom portion of the evaporation tank, to the reaction column.

According to this document, the condensates at the temperature of from 50° C. to −50° C. are refluxed to the reaction column by means of upper condensers each of which has a reflux feed pipe serially connected to a top portion of the reaction column. The number of upper condensers with the reflux feed pipe is at least 2. A production amount (production amount per hour based on mole) of monosilane as the desired product depends on the number of condensers but use of too many condensers, for example, also decreases the production amount of monosilane. So it could be a main inconvenience in this kind of process.

Moreover, a temperature difference between the condensates of upper condensers adjacent to each other is appropriately determined in accordance with the number of upper condensers with the reflux feed pipe. Where a temperature of the condensate of the $(i+1)^{th}$ upper condenser from the top portion of the reaction column (i is an integer of at least 1) is $T_i$ and a temperature of the condensate of the $(i+1)^{th}$ upper condenser is $T_{i+1}$, and when the number of upper condensers is from 2 to 5, the temperature difference is determined preferably in a range of $T_i - T_{i+1} \geq 10°$ C. and more preferably in a range of from 15° C. to 100° C., depending on the specific number of upper condensers.

Furthermore, when the number of upper condensers is 3 or 4, the temperature difference is determined preferably in a range of $T_i - T_{i+1} \geq 15°$ C. and more preferably in a range of from 20° C. to 60° C., depending on the specific number of upper condensers. If the temperature difference between the upper condensers is too small, a separation efficiency or yield of monosilane from the mixture containing monosilane, monochlorosilane, dichlorosilane and trichlorosilane might be decreased, or a recovery efficiency of monochlorosilane, dichlorosilane and trichlorosilane might be decreased. So it is understood that this process is very hard to be implemented and it is easy to make a mistake in the determination of the different parameters (number of condensers, temperature in each condenser . . . ).

Furthermore, it is necessary to implement a process with a reduction of refrigeration power compared to the process described above.

The present invention aims at solving the problem by removing the inconvenience of the process described above and to improve the reduction of refrigeration power.

SUMMARY

The present invention resides in a process for separating monosilane from a mixture comprising at least monosilane, monochlorosilane, dichlorosilane, and trichlorosilane comprising:

a) Introducing said mixture to a condenser for separating lower-boiling chlorosilanes-containing monosilane from higher-boiling chlorosilanes enriched condensates;

b) Collecting said higher-boiling condensates, in a condensate buffer connected to the aforesaid condenser by a condensate feed pipe;

c) Sending higher-boiling chlorosilanes enriched condensates from the aforesaid condensate buffer into a subcooler which is installed on a reflux feed line connected to the upper portion of a chlorosilane absorber;

d) Feeding aforesaid lower-boiling chlorosilanes-containing monosilane to the aforesaid chlorosilane absorber for separating monosilane;

e) Extracting monosilane-rich gas from the upper portion of the aforesaid chlorosilane absorber; characterized in that only one condenser is used during the process.

Higher boiling point means a boiling temperature which is condensable at cooling water temperature.

Lower boiling point means a boiling temperature which is not condensable at cooling water temperature.

The upper portion of the absorber means a region higher than half of the absorber in height from the bottom.

Monosilane-rich gas means a gaseous mixture containing more than 60% mol of monosilane.

Other embodiments of the invention are:

A process as defined above comprising: step f) extracting a pure monosilane gas from a distillation column downstream the chlorosilane absorber.

A pure monosilane gas is a gas comprising more than 80% of monosilane.

A process as defined above wherein step c) comprises subcooling higher-boiling chlorosilanes enriched condensates by a refrigerant and serving as a reflux to the upper portion of the aforesaid chlorosilane absorber.

A process as defined above wherein the refrigerant cools down aforesaid higher-boiling chlorosilanes enriched condensates to a temperature comprised between −100° C. and 20° C. Such a refrigerant is chosen from, for example, Brine (for example Lithium bromide, Calcium Chloride, Sodium chloride, Magnesium chloride), Chlorofluorocarbon (commonly called as Freon), Ammonia, Hydrocarbon, and an antifreeze solution (like aqueous Ethylene glycol), etc. Higher temperature than 20° C. makes absorption process at the aforesaid chlorosilane absorber inefficient, and lower temperature than −100° C. has a risk of solidification of hydrochlorosilanes.

A process as defined above wherein said mixture comprises:
a) more than 50 mole % of a mixture comprising monochlorosilane (MCS), dichlorosilane (DCS), trichlorosilane (TCS) and tetrachlorosilane (STC); and
b) from 0.1 to 40 mole % of monosilane.

A process as defined above wherein said monosilane-rich gas extracted from the absorber comprises more than 60 mole % of monosilane.

A process as defined above wherein during step d), the separation of monosilane in the aforesaid absorber is a distillation.

A process as defined above comprising:
g) Extracting chlorosilane condensates from the bottom portion of the aforesaid chlorosilane absorber to be recycled.

A process as defined above wherein said mixture, to be treated, comprising at least monosilane, monochlorosilane, dichlorosilane, and trichlorosilane is produced thanks to a method comprising the steps: producing said mixture by means of a production apparatus comprising a reaction column, a bottom reboiler of the reaction column, and an evaporation tank connected to a bottom portion of the reaction column; the method comprising supplying at least one of trichlorosilane and dichlorosilane to the reaction column (or to the aforesaid subcooler, or to the aforesaid chlorosilane absorber of this invention, is also possible), supplying at least one of a tertiary aliphatic hydrocarbon-substituted amine and a tertiary aliphatic hydrocarbon-substituted amine hydrochloride as a catalyst to an upper stage of the reaction column.

A process as defined above, comprising the steps of:
bringing the condensates extracted during the step g) into contact with the catalyst in the reaction column;
withdrawing a bottom recovery liquid containing tetrachlorosilane and the catalyst from the bottom portion of the reaction column;
introducing the bottom recovery liquid into the evaporation tank; and
recycling the catalyst recovered from the bottom portion of the evaporation tank, to the upper stage of the reaction column. Chlorosilanes rich mixture means a mixture which fulfills two following conditions: the total content of monochlorosilane (MCS), dichlorosilane (DCS), trichlorosilane (TCS) and tetrachlorosilane (STC) is more than 50 mol %, and the total content of monosilane is from 0.1 to 40 mol %.

The process of the present invention is implemented downstream a method for producing a chlorosilanes rich mixture containing monosilane comprising the steps:
producing chlorosilanes rich mixture containing monosilane by means of a production apparatus comprising a reaction column, a bottom reboiler of the reaction column, and an evaporation tank connected to a bottom portion of the reaction column; the method comprising supplying at least one of trichlorosilane and dichlorosilane to the reaction column, supplying at least one of a tertiary aliphatic hydrocarbon-substituted amine and a tertiary aliphatic hydrocarbon-substituted amine hydrochloride as a catalyst to an upper stage of the reaction column.

According to another embodiment, the process of the invention comprises the steps of:
bringing the condensates extracted during the step g) into contact with the catalyst in the reaction column;
withdrawing a bottom recovery liquid containing tetrachlorosilane and the catalyst from the bottom portion of the reaction column;
introducing the bottom recovery liquid into the evaporation tank; and
recycling the catalyst recovered from the bottom portion of the evaporation tank, to the reaction column.

A raw material to be used is at least one of trichlorosilane and dichlorosilane. An amount of dichlorosilane is preferably from 2 to 100 mole % percent and more preferably from 5 to 55 mole % to a total amount of trichlorosilane and dichlorosilane. If the amount is less than 2 mole %, productivity of monosilane might not be improved. The amount of dichlorosilane is more preferably in a range of not more than 55 mole % from the economical viewpoint.

A catalyst to be used is at least one of a tertiary aliphatic hydrocarbon-substituted amine and a tertiary aliphatic hydrocarbon-substituted amine hydrochloride. Compounds represented by formulae $R_1R_2R_3N$ (A) and $R_1R_2R_3NH^+Cl^-$ (B) are suitably used for the tertiary aliphatic hydrocarbon-substituted amine and the tertiary aliphatic hydrocarbon-substituted amine hydrochloride, respectively.

In the formulae (A) and (B), each of $R_1$, $R_2$ and $R_3$ is an aliphatic hydrocarbon group, the carbon number of each of $R_1$, $R_2$ and $R_3$ is at least 2, and $R_1$, $R_2$ and $R_3$ may be the same or different.

The tertiary aliphatic hydrocarbon-substituted amine may be, for example, tri-n-octylamine, tri-n-butylamine, and so on. In the above formulae (A) and (B), the carbon number of each of the aliphatic hydrocarbon groups is preferably at least 2 and more preferably from 6 to 15. If the carbon numbers of the aliphatic hydrocarbon groups are less than 2, the catalyst might be likely to become solid in contact with trichlorosilane. When the catalyst becomes solid, it might cause choking in a tray, packing and so on of the reaction column, so as to result in failure in smooth and continuous operation.

In the present invention, the above-mentioned catalyst is applied and brought into contact with trichlorosilane/dichlorosilane, thereby forming dichlorosilane, monochlorosilane and monosilane in accordance with the following disproportionation formulae (1), (2) and (3):

$$2SiHCl_3 \Leftrightarrow SiCl_4+SiH_2Cl_2 \quad (1)$$

$$2SiH_2Cl_2 \Leftrightarrow SiHCl_3+SiH_3Cl \quad (2)$$

$$2SiH_3Cl \Leftrightarrow SiH_2Cl_2+SiH_4 \quad (3)$$

Among others, it is preferable to use from 98 to 50 mole %, particularly preferably from 98 to 60 mole % tertiary aliphatic hydrocarbon-substituted amine and from 2 to 50 mole %, particularly preferably from 2 to 40 mole % tertiary aliphatic hydrocarbon-substituted amine hydrochloride.

If the rate of the latter is less than 2 mole %, the catalytic activity is low; if the rate exceeds 40 mole %, hydrochloric acid is released during the reactions, whereby reactions below proceed and monosilane is not efficiently produced.

$$SiH_4+HCl \rightarrow SiH_3Cl+H_2 \quad (4)$$

$$SiH_3Cl+HCl+SiH_2Cl_2+H_2 \quad (5)$$

$$SiH_2Cl_2+HC \rightarrow SiHCl_3+H_2 \quad (6)$$

$$SiHCl_3+HCl \rightarrow SiCl_4+H_2 \quad (7)$$

The reaction column is one of a distillation column type, and the reaction column suitably used may be a plate column partitioned by sieve trays, bubble cap trays or the like, or a packed column filled with a packing material such as Raschig ring or pall ring. Since the production of monosilane is a liquid phase reaction through the disproportionation reactions, the reaction column is preferably one having a large liquid hold-up capacity.

The reaction temperature is not constant, either because of a temperature distribution in the reaction column, but the reactions are conducted, for example, in a range of from 10° C. to 150° C., preferably from 30° C. to 120° C. If the reaction temperature is lower than 10° C., the reaction temperature could be too low for the disproportionation reactions to substantially proceed. On the other hand, if the temperature exceeds 150° C., thermal decomposition of the catalyst is likely to take place, which is undesirable. Since the reactions are preferably conducted in a boiling state, the gauge pressure is preferably at a level of from 100 kPaG to 1000 kPaG, more preferably from 100 kPaG to 500 kPaG in order to keep the reaction temperature in the above-mentioned range.

The temperature of the bottom portion is controlled by the bottom reboiler, and tetrachlorosilane which need not be returned to the reaction column is preferably selectively recovered from the bottom portion. Therefore, the temperature of the bottom reboiler is preferably from 100° C. to 150° C., more preferably from 90° C. to 120° C.

The mixture formed by the reactions in the top of the reaction column contains chlorosilanes of monochlorosilane, dichlorosilane and trichlorosilane, and monosilane. The process of the present invention aims at separating monosilane from chlorosilanes-rich monosilane, by providing a chlorosilane absorber whereas in prior art, upper-plate serial condensers are adopted. Furthermore, chlorosilanes enriched condensate (around 40° C., depending upon available cooling water temperature at the site and design of the upper condenser) is sub-cooled in the reflux condenser to a temperature comprised between −100° C. and 20° C., more preferably between −60° C. and 20° C. from the economical viewpoint by using a refrigerant and served to the top of the aforementioned absorption tower as its reflux. Whereas in prior art, chlorosilanes enriched condensate is simply sent back to a distillation column or/and a reactor for disproportionate reaction.

In prior art, condensate of monosilane and chlorosilane family gaseous mixture around refrigeration temperature (between −100° C. and 20° C.) inhibits heat transfer at the condenser because of the existence of incondensable gas, therefore large heat exchanger is required.

An advantage of the present invention is that no such heat transfer inhibition occurred, because condensate in liquid phase is sub-cooled by a refrigerant in liquid phase (liquid-liquid heat exchanger), so no heat transfer inhibition occurred.

Therefore, size of heat exchanger is smaller compared to prior art.

BRIEF DESCRIPTION OF THE DRAWINGS

FIG. 1 is a schematic diagram showing an example of an apparatus to be used in the process of the present invention.

DESCRIPTION OF PREFERRED
EMBODIMENTS

A mixture of trichlorosilane and dichlorosilane is supplied through a raw material feed pipe 4 to a reaction column 1. The reaction column 1 is a distillation column made of stainless steel and each tray is a sieve tray. Above the reaction column 1 (in a region above an upper tray), there are a unique upper condenser 3, which can be cooled by supplying cooling water. In the lower portion of the reaction column 1, there is provided a bottom reboiler 2.

The disproportionation reactions and the separation by distillation proceed simultaneously in the reaction column 1 and a gas rich in low-boiling-point components such as monosilane produced in the disproportionation reactions moves upward. The resultant mixture discharged from the top portion of the reaction column, comprising monosilane, monochlorosilane, dichlorosilane, and trichlorosilane is supplied to the upper condenser 3, to be cooled (at around 40° C.). Here, the chlorosilanes enriched monosilane are separated from a chlorosilanes condensate. The chlorosilanes enriched monosilane is sent, via the pipe 6, to the bottom part of a chlorosilane absorber 20 which is installed between reactivate distillation column 1 and a pure monosilane distillation column 22. In this absorber 20, there is a separation of monosilane from chlorosilanes enriched monosilane, then in the column 22, there is a distillation to get a pure monosilane (containing more than 80 mole % of monosilane) downstream this column 22. This is the aim of the process of the present invention to get a pure monosilane gas (i.e containing more than 80 mole % of monosilane out of 100 mole % of gas). Thanks to the pipe 5 on the bottom of the absorber 20, the chlorosilanes condensates, from the absorber 20, are recycled toward the top portion of the reaction column 1.

The chlorosilanes condensates from the separation localized in the upper condensate 3 are collected in a condensate buffer 19 wherein the temperature is about 40° C. (depending upon available cooling water temperature at the site and design of the upper condenser 3). Downstream this buffer 19, via a pipe 7, the chlorosilanes condensates are sent to a reflux condenser 21, wherein the condensates are sub-cooled to a temperature comprised between −100° C. and 20° C., for example −10° C., by using a refrigerant and served to the top 23 of the aforementioned absorber 20 as its reflux. Whereas in prior art, chlorosilanes enriched condensate is simply sent back to a distillation column or/and a reactor for disproportionate reaction. In the present invention, because condensate is sub-cooled by a refrigerant (liquid-liquid heat exchanger) no heat transfer inhibition occurs because of the existence of incondensable gas.

Said refrigerant is selected according to the subcooling temperature ranging from −100° C. and 20° C., more preferably from −60 to 20° C. For example, Brine (for example Lithium bromide, Calcium Chloride, Sodium chloride, Magnesium chloride), Chlorofluorocarbon (commonly called as Freon), Ammonia, Hydrocarbon, and an antifreeze solution (like aqueous Ethylene glycol), etc.

A gas absorption system (or absorber) is a unit operation in which soluble components of a gas mixture are dissolved in a liquid. Absorption makes use of special equipment for bringing gas and liquid phases into intimate contact. Absorption operation is usually carried out in vertical, cylindrical columns or towers in which devices such as plates or packing elements are placed. The gas and liquid normally flow counter currently, and the devices serve to provide the contacting and development of interfacial surface through which mass transfer takes place.

High-boiling-point components such as tetrachlorosilane, resulting from the reactions in the top of the reaction column 1, move to the bottom portion of the reaction column 1 (a region lower than the lowest tray) and are withdrawn together with the catalyst from the bottom reboiler 2 to an evaporation tank 12 while the liquid level thereof is controlled. The evaporation tank 12 may be a vessel of stainless steel equipped with an agitator, and it is provided with a jacket. A heating medium is circulated in the jacket to heat the evaporation tank 12. The evaporation tank 12 is operated at a temperature which is higher than the boiling point of tetrachlorosilane formed by the disproportionation reactions and lower than the boiling point of the catalyst; tetrachlorosilane and others are evaporated, collected in a lower condenser 13 cooled with cooling water and recovered into a collecting tank 14. The catalyst remaining in the evaporation tank 12 is withdrawn by a pump 11 and recycled to the upper stage of the reaction column 1 via the pipe 24. In this case, if the concentration of the tertiary aliphatic hydrocarbon-substituted amine hydrochloride in the catalyst is less than a predetermined concentration, hydrogen chloride is supplied through a supply pipe 15 as occasion may demand.

In another embodiment, a portion of the chlorosilanes condensates, returning to the reaction column 1 from the absorber 20, is recirculated back to the condensate buffer 19 through a valve to have more flow to be sub-cooled at the subcooler 21 and refluxed to the chlorosilane absorber 20. Although it increases refrigeration duty, it can enlarge the temperature difference in the absorber 20 when this difference is too narrow to design the absorber.

In another embodiment, the feed mixture of trichlorosilane and dichlorosilane 4 is supplied to the subcooler 21 after mixing with the chlorosilanes condensates 7. As this feed mixture 4 is normally non-saturated liquid and has more absorption capacity than saturated chlorosilanes condensates 7, it can mitigate subcooling temperature level and make it higher by several degrees.

In another embodiment, the chlorosilane absorber 20 may be divided into two parts. The feed mixture of trichlorosilane and dichlorosilane 4 is supplied to a first absorber 20-*a*, while the chlorosilanes condensates 7 is supplied to a second absorber 20-*b*, respectively. This enables side-by-side installation of these two absorbers, and therefore the height of the installation can be reduced. This process will give flexibility about how to connect the returning line 5 with upstream process, as there are two returning line 5-*a* and 5-*b* of chlorosilanes condensates which have normally quite different concentration of compositions.

With the technology of the present invention, the inventors solved the problems of the prior art.

On one hand, the size of heat exchanger unit is smaller compared to prior art (1/10 of heat transfer area compared to area of the process described in EP2085358), and on the other hand, the electric power consumption for refrigeration is reduced of 10% to 60%.

For example, in the conditions detailed in table 1, the process of the present invention generates a reduction of more than 40% of the electric power consumption for refrigeration.

TABLE 1

| Fluid name | Unit | Between column 1 and condenser 3 | Pipe 6 | Between condenser 3 and buffer 19 | Between reflux condenser 21 and absorber 20 | Downstream absorber 20 | Pipe 5 |
|---|---|---|---|---|---|---|---|
| Flow | Nm3/h | 770 | 166 | 604 | 604 | 39 | 732 |
| Pressure | Bar | 3.46 | 3.45 | 3.46 | 3.46 | 3.44 | 3.45 |
| Temperature | ° C. | 58.1 | 40 | 40 | −6.2 | 0.9 | 35.8 |
| $H_2$ | Mol % | 0.9 | 3.9 | 0 | 0 | 16.8 | 0 |
| Monosilane | Mol % | 3.9 | 15.4 | 0.7 | 0.7 | 60 | 0.9 |
| Monochlorosilane | Mol % | 9.8 | 18.5 | 7.4 | 7.4 | 6.9 | 10 |
| Dichlorosilane | Mol % | 49 | 44.9 | 50.1 | 50.1 | 12.5 | 50.9 |
| Trichlorosilane | Mol % | 36.2 | 17.2 | 41.4 | 41.4 | 3.9 | 37.9 |
| Tétrachlorosilane | Mol % | 0.3 | 0.1 | 0.3 | 0.3 | 0 | 0.3 |
| $H_2$ | Nm3/h | 6.5 | 6.5 | 0 | 0 | 6.5 | 0 |
| Monosilane | Nm3/h | 30 | 25.6 | 4.5 | 4.5 | 23.3 | 6.8 |
| Monochlorosilane | Nm3/h | 75.6 | 30.6 | 45 | 45 | 2.7 | 73 |
| Dichlorosilane | Nm3/h | 377.1 | 74.5 | 302.6 | 302.6 | 4.8 | 372.3 |
| Trichlorosilane | Nm3/h | 278.8 | 28.5 | 250.3 | 250.3 | 1.5 | 277.3 |
| Tétrachlorosilane | Nm3/h | 2.1 | 0.1 | 2 | 2 | 0 | 2.1 |

The electric power consumption is of 10-12 kWe in the condenser 3 and about 25-30 kWe in the reflux condenser 21. So the total electric power consumption for refrigeration is about 35-40 kWe.

In the same conditions, in the process described by EP2085358 wherein there are serial upper condensers rather than a reflux condenser with an absorber, the total electric power consumption for refrigeration is about 70 kWe.

The invention claimed is:

1. A process for separating monosilane from a mixture comprising at least monosilane, monochlorosilane, dichlorosilane, and trichlorosilane comprising:

a) introducing said mixture to a condenser for separating lower-boiling chlorosilanes-containing monosilane from higher-boiling chlorosilanes enriched condensates;

b) collecting said higher-boiling condensates, in a condensate buffer connected to the condenser by a condensate feed pipe;

c) sending higher-boiling chlorosilanes enriched condensates from the condensate buffer into a subcooler which is installed on a reflux feed line connected to an upper portion of a chlorosilane absorber d) feeding a lower-boiling chlorosilanes-containing monosilane to the chlorosilane absorber for separating monosilane;

e) extracting monosilane-rich gas from the upper portion of the chlorosilane absorber;

characterized in that only one condenser is used during the process.

2. The process of claim 1, further comprising the step:

f) extracting a pure monosilane gas from a distillation column downstream of the chlorosilane absorber.

3. The process of claim 1, wherein step c) comprises subcooling higher-boiling chlorosilanes enriched condensates by a refrigerant and serving as a reflux to the upper portion of the chlorosilane absorber.

4. The process of claim 3, wherein the refrigerant is chosen from Lithium bromide brine, Calcium Chloride brine, Sodium chloride brine, Magnesium chloride brine, Chlorofluorocarbon, Ammonia, Hydrocarbon, or an antifreeze solution.

5. The process of claim 1, wherein said mixture comprises:
more than 50 mol % of a mixture comprising monochlorosilane (MCS), dichlorosilane (DCS), trichlorosilane (TCS) and tetrachlorosilane (STC); and
from 0.1 to 40 mol % of monosilane.

6. The process of claim 1, wherein said monosilane-rich gas comprises more than 60% mol of monosilane.

7. The process of claim 1, wherein during step d) the separation of monosilane in the absorber is a distillation.

8. The process of claim 2, further comprising:

g) extracting chlorosilane condensates from a bottom portion of the chlorosilane absorber to be recycled.

* * * * *